July 16, 1935.  R. KUSCHE  2,008,254
COMBINED CREAM SEPARATOR AND CLOSURE FOR MILK BOTTLES
Filed March 4, 1935
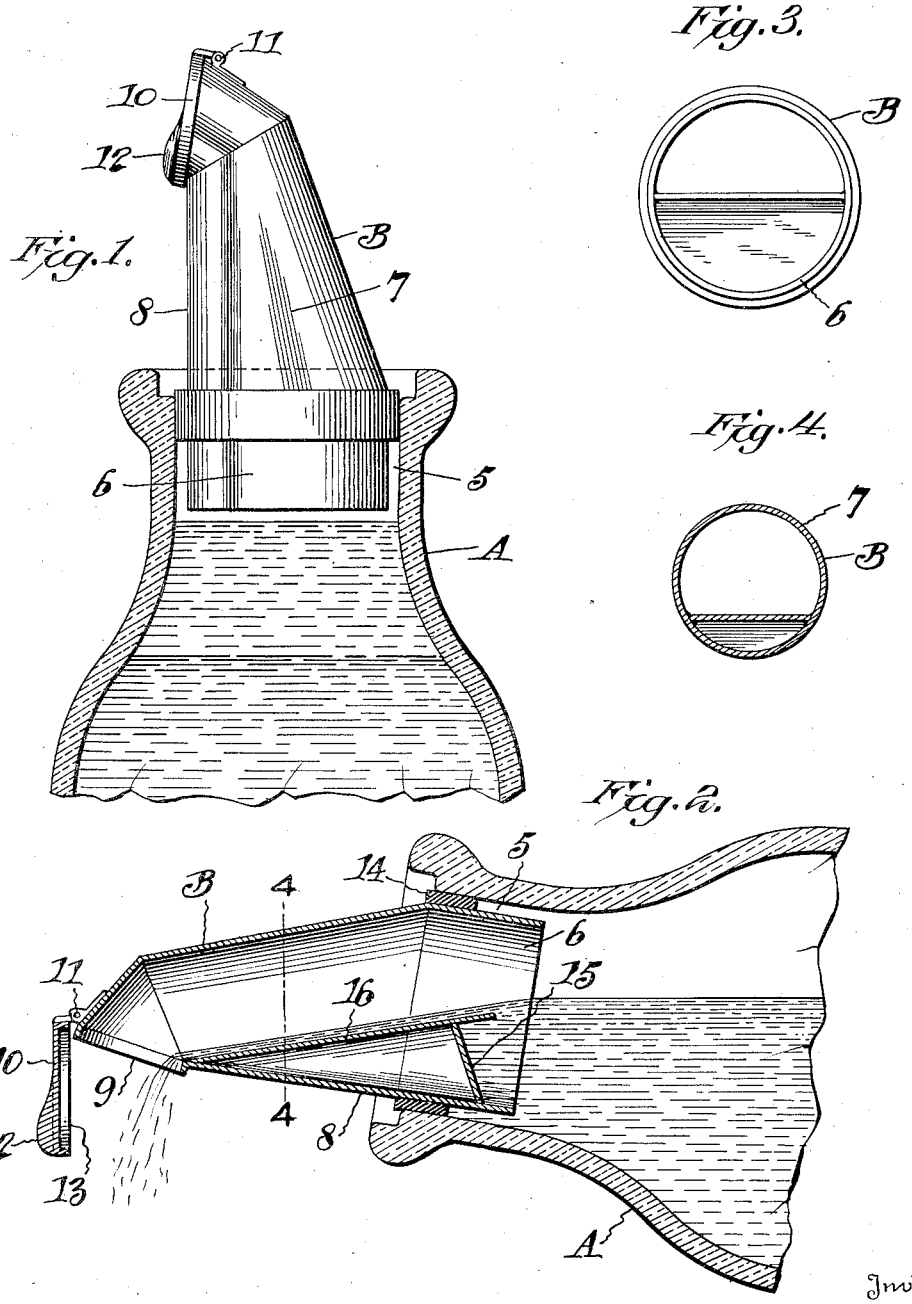
Inventor
Reinhold Kusche.
By
Attorney

Patented July 16, 1935

2,008,254

UNITED STATES PATENT OFFICE 2,008,254

COMBINED CREAM SEPARATOR AND CLOSURE FOR MILK BOTTLES

Reinhold Kusche, Los Angeles, Calif.

Application March 4, 1935, Serial No. 9,297

2 Claims. (Cl. 210—51.5)

This invention relates to new and useful improvements in a combined cream separator and closure adapted to be applied to a milk bottle.

The principal object of my invention is to provide a pouring spout for milk bottles which normally will seal the mouth of the bottle from the atmosphere and thereby prevent contamination of the milk, and which will function to separate the cream from the milk and permit the separated cream to be poured when the bottle is tilted.

With these and other objects in view which will more fully appear, the nature of the invention will be more clearly understood by following the description, the appended claims, and the several views illustrated in the accompanying drawing.

In the drawing:—

Figure 1 is a view showing the normal position of the spout and bottle,

Figure 2 is a longitudinal sectional view showing the spout and bottle inclined for pouring and separating purposes, Figure 3 is a bottom view of the spout, and Figure 4 is a detail cross section taken on the line 4—4 of Figure 2.

Like reference numerals designate corresponding parts throughout the several figures of the drawing.

Referring to the drawing, my invention includes a milk bottle A having the usual mouth 5, and a pouring spout B.

The spout B is preferably formed of sheet metal and includes a circular base 6 from which rises a coni-form body portion 7. The body portion 7 includes a longitudinally extending vertical portion 8, the latter being disposed in a plane at right angles to the transverse plane of the body portion 6. The upper end of the body portion terminates in an opening 9 which is slightly inclined rearwardly and upwardly relative to the wall portion 8. A closure element 10 for the opening 9 is hingedly connected at its upper end as at 11 to the upper end of the spout above said opening 9. This closure element is provided adjacent its lower or free edge with a weight 12 for causing the closure element to open automatically when cream is being poured from the bottle as shown in Figure 2, and to automatically close said opening when the bottle is returned to its normal position as shown in Figure 1. The closure 10 is provided with a peripheral flange 13 which is adapted to embrace the opening 9 when the closure is seated and thereby seal the opening 9 against the ingress of air. In order to frictionally retain the spout B in the mouth 5 of the bottle, I have provided an elastic sleeve 14 around the base 6 of the spout for frictionally engaging the inner surface of the mouth 5 of the bottle. This sleeve not only supports the spout in proper position within the mouth of the bottle but also functions to seal the connection therebetween so as to exclude the admission of air into the bottle. Thus when the bottle is in its normal or standing position, the atmospheric air cannot contaminate the milk contained within the bottle.

The spout B is provided with means for causing the cream which is located in the bottle to be separated from the milk when the bottle is first inclined to effect a pouring action. To this end a dam 15 of sheet metal is mounted within the base 6 of the spout and extends transversely across said base. The peripheral edge of the dam is soldered or otherwise sealed to the associated wall portion of the base 6. This dam is disposed on the same side of the base 6 as the vertical wall portion 8 and the upper edge of said dam is disposed in spaced relation to the diametrically opposite wall portion to form a passage for the cream. A floor 16, also of sheet metal, is located within the spout and extends from the dam 15 to the opening 9 and has its edges soldered to the dam and to the walls of the spout.

In operation assuming the spout has been placed within the mouth 5 of the bottle A and it is desired to separate the cream from the milk, the user merely tilts the bottle to the position shown in Figure 2 and the cream will thereupon pass over the top of the dam 15 and along the floor 16 and thence upwardly through the opening 9, the closure 10 having been previously opened automatically by the weight 12. As soon as the user desires to cease pouring the cream, or milk as the case may be, the bottle is returned to its upright position as shown in Figure 1 and the closure 12 will automatically seal the opening 9. In this position the bottle together with the spout therein may be left undisturbed for whatever period as may be desired without fear of the atmosphere being admitted into the bottle.

It is of course to be understood that the details of structure and arrangement of parts may be variously changed and modified without departing from the spirit and scope of my invention.

I claim:—

1. A combined cream separator and closure for milk bottles comprising a pouring spout having a tubular base and a cone-shaped body extending therefrom and terminating at its outer end in a substantially vertically disposed outlet opening, the axis of the cone-shaped body being inclined to the axis of the tubular base, a weighted closure element for the opening hinged at its upper end to the upper end of the spout above the opening, and a dam extending partially across the spout adjacent the lower end thereof and located on the same side of the spout as the outlet opening.

2. A combined cream separator and closure for milk bottles comprising a pouring spout having a tubular base and a cone-shaped body extending therefrom and terminating at its outer end in a substantially vertically disposed outlet opening, the axis of the cone-shaped body being inclined to the axis of the tubular base, a weighted closure element for the opening hinged at its upper end to the upper end of the spout above the opening, a dam extending partially across the spout adjacent the lower end thereof and located on the same side of the spout as the outlet opening, and a floor located within the spout and extending from the dam to the opening and having sealed connections along its edges with said dam and the spout.

REINHOLD KUSCHE.